(12) United States Patent
Park et al.

(10) Patent No.: US 9,761,938 B2
(45) Date of Patent: Sep. 12, 2017

(54) ANTENNA APPARATUS FOR BASE STATION AND OPERATION METHOD THEREFOR

(71) Applicant: SK TELECOM CO., LTD., Seoul (KR)

(72) Inventors: Hae Sung Park, Yongin-si (KR); Duk Kyung Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 95 days.

(21) Appl. No.: 14/850,654

(22) Filed: Sep. 10, 2015

(65) Prior Publication Data

US 2016/0006120 A1 Jan. 7, 2016

Related U.S. Application Data

(63) Continuation of application No. PCT/KR2014/002083, filed on Mar. 13, 2014.

(30) Foreign Application Priority Data

Mar. 19, 2013 (KR) ........................ 10-2013-0029311

(51) Int. Cl.
| | |
|---|---|
| *H04W 16/28* | (2009.01) |
| *H01Q 3/00* | (2006.01) |
| *H01Q 1/24* | (2006.01) |
| *H01Q 5/40* | (2015.01) |
| *H04W 72/04* | (2009.01) |
| *H01Q 5/30* | (2015.01) |
| *H04W 88/08* | (2009.01) |

(52) U.S. Cl.
CPC .............. *H01Q 3/00* (2013.01); *H01Q 1/246* (2013.01); *H01Q 5/30* (2015.01); *H01Q 5/40* (2015.01); *H04W 16/28* (2013.01); *H04W 72/0453* (2013.01); *H04W 88/08* (2013.01)

(58) Field of Classification Search
CPC ......... H01Q 3/00; H01Q 1/246; H04W 16/28; H04W 88/08
See application file for complete search history.

(56) References Cited

U.S. PATENT DOCUMENTS

2010/0159930 A1* 6/2010 Hagerman ............... H01Q 3/04
455/436

FOREIGN PATENT DOCUMENTS

CN 102273013 A * 12/2011 ............ H01Q 1/246
KR 1020080089522 A 10/2008
(Continued)

OTHER PUBLICATIONS

International Search Report mailed Apr. 11, 2014 for PCT/KR2014/002083.

*Primary Examiner* — Dieu H Duong
(74) *Attorney, Agent, or Firm* — Hauptman Ham, LLP

(57) ABSTRACT

An antenna apparatus for base station (BS) having at least one cell, includes: two or more antenna units to form antenna beams based on predetermined tilting angles for each of two or more different frequency bands with respect to the cell; and a tilting angle control unit to control tilting angles designated to the two or more antenna units, respectively, to be different from each other, so as to make coverages of the antenna beams of the two or more different frequency bands formed by the two or more antenna units different from each other with respect to the cell.

12 Claims, 7 Drawing Sheets

(56) References Cited

FOREIGN PATENT DOCUMENTS

| | | | |
|---|---|---|---|
| KR | 1020110009063 | A | 1/2011 |
| KR | 1020110044302 | A | 4/2011 |
| KR | 101199423 | B1 | 11/2012 |

\* cited by examiner

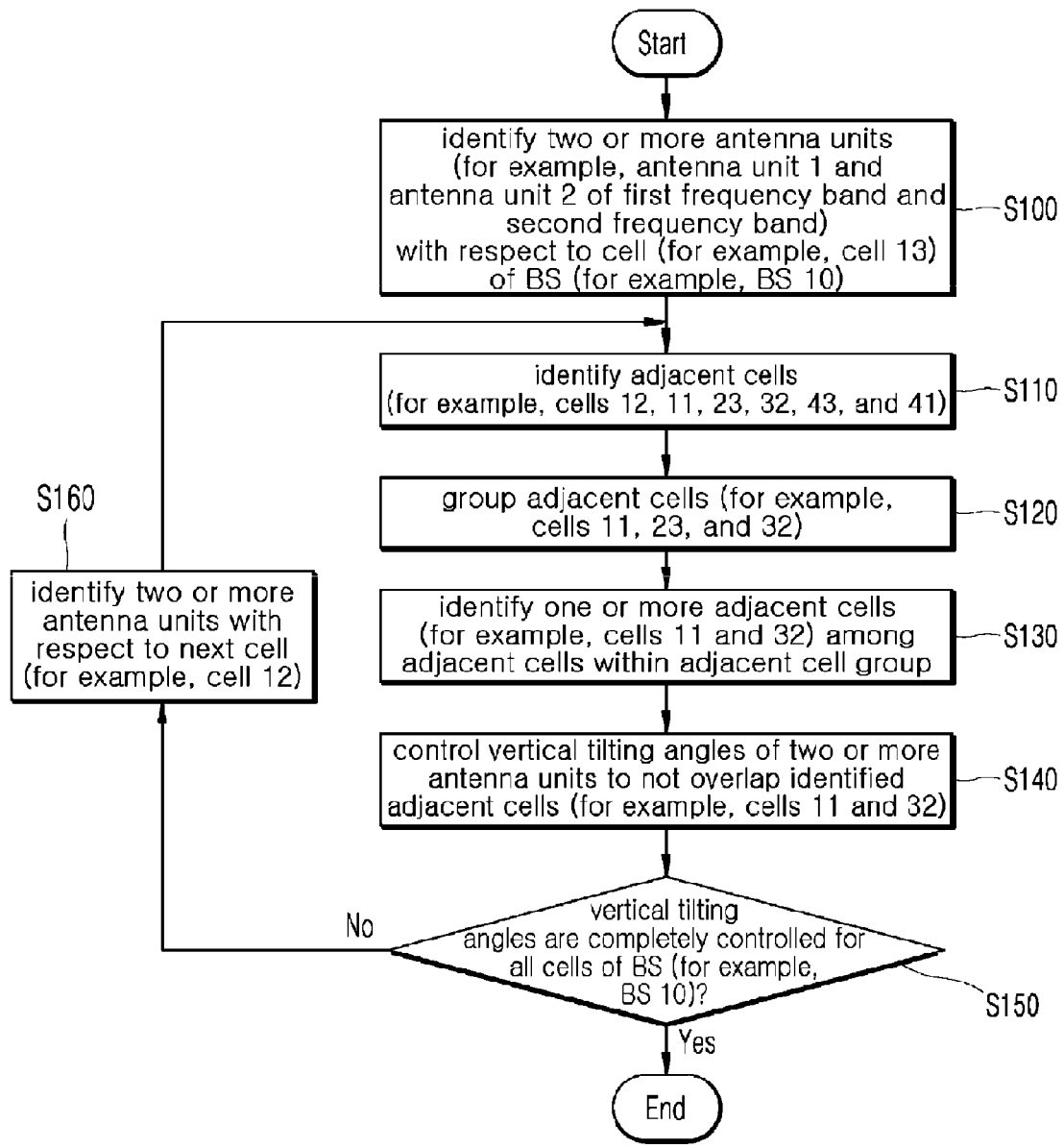

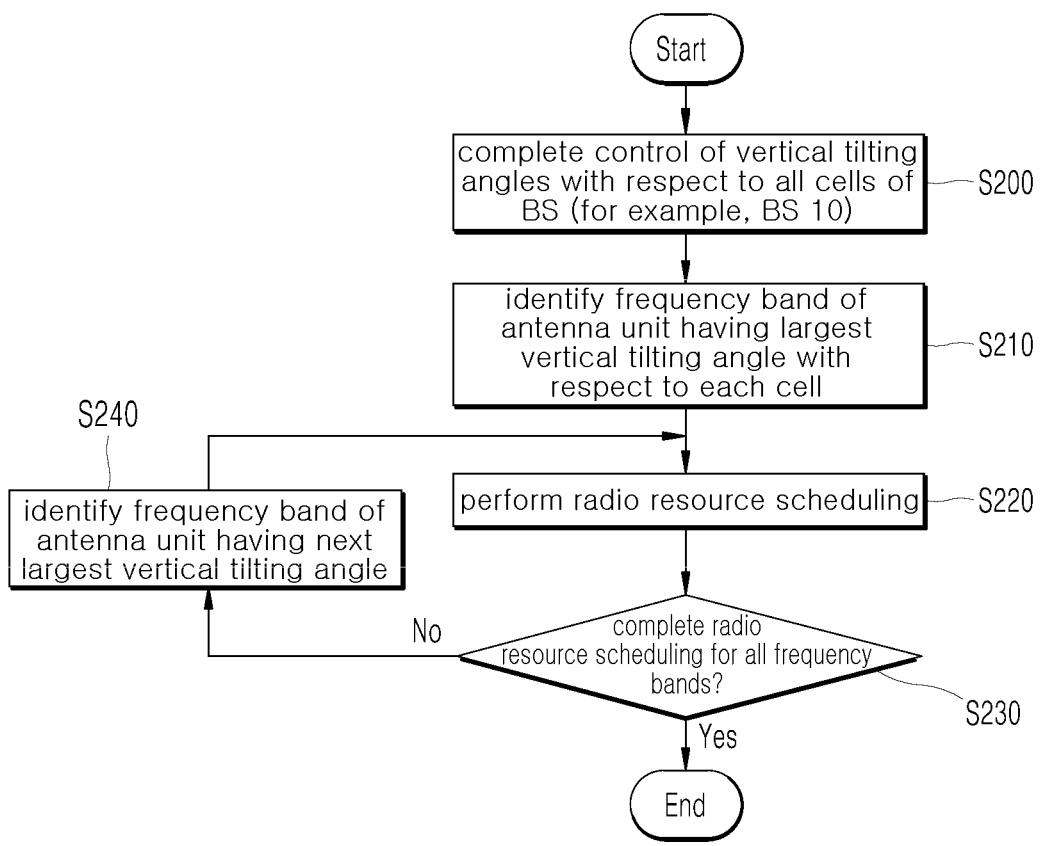

ANTENNA APPARATUS FOR BASE STATION AND OPERATION METHOD THEREFOR

CROSS-REFERENCE TO RELATED APPLICATIONS

The instant application is a continuation of PCT/KR2014/002083, filed on Mar. 13, 2014, which is based on and claims priority to Korean Patent Application No. 10-2013-0029311, filed on Mar. 19, 2013. The disclosures of above-listed applications are hereby incorporated by reference herein in their entirety.

TECHNICAL FIELD

The present disclosure relates to an antenna apparatus for a base station to improve a basic data transmission rate and promote capability improvements.

BACKGROUND ART

The statements in this section merely provide background information related to the present disclosure and do not constitute prior art.

In a mobile communication system, the air exists between a base station (BS) and a user equipment (UE), and an antenna apparatus is used to transmit and/or receive wireless signals between the BS and the UE.

Meanwhile, as the introduction of smart phones is currently accelerating, an antenna apparatus of the BS requires the application of carrier aggregation in which various frequency bands simultaneously operate to handle a rapid increase in data traffic.

Accordingly, the BS applying the carrier aggregation transmits antenna beams (Component Carriers: CCs) of a plurality of frequency bands to one cell, so that coverage of antenna beams of each of the various frequency bands exists in one cell.

BSs 10 and 20 applying the carrier aggregation will be described below with reference to FIG. 1. An antenna apparatus 1 the BS 10 transmits antenna beams CC1 and CC2 of two frequency bands to one cell, so that coverage of antenna beams of two frequency bands exist with respect to one cell. Further, an antenna apparatus 2 of the BS 20 transmits antenna beams CC1 and CC2 of two frequency bands to one cell, so that coverages of antenna beams of two frequency bands exist with respect to one cell.

Accordingly, the inventor(s) has noted that when a communication service is provided through a BS applying carrier aggregation, a UE uses a wider bandwidth through the BS, and thus a rapid increase in data traffic is efficiently handled and the data transmission rate is improved.

However, the inventor(s) has noted that in a case of the BS applying the carrier aggregation, only a basic data transmission rate is improved according to the carrier aggregation.

SUMMARY

In accordance with an aspect of the present disclosure, an antenna apparatus for base station (BS) having at least one cell comprises two or more antenna units and a tilting angle control unit. The two or more antenna units is configured to form antenna beams based on predetermined tilting angles for each of two or more different frequency bands with respect to the cell. And the tilting angle control unit is configured to control tilting angles designated to the two or more antenna units, respectively, to be different from each other, so as to make coverages of the antenna beams of the two or more different frequency bands formed by the two or more antenna units different from each other with respect to the cell.

In accordance with another aspect of the present disclosure, a method of operating an antenna apparatus for base station (BS) having at least one cell includes: identifying two or more antenna units for forming antenna beams based on predetermined tilting angles for each of two or more different frequency bands with respect to the cell; and controlling tilting angles designated to the two or more antenna units, respectively, to be different from each other, so as to make coverages of antenna beams of the two or more different frequency bands formed by the two or more antenna units different from each other with respect to the cell.

BRIEF DESCRIPTION OF THE DRAWINGS

The above and other objects, features and advantages of the present disclosure will be more apparent from the following detailed description taken in conjunction with the accompanying drawings, in which:

FIGS. 6 and 7 are flowcharts of an operation method of an antenna apparatus for BS according to an exemplary embodiment of the present disclosure.

DETAILED DESCRIPTION

Some embodiments of the present disclosure provide an antenna apparatus for base station (BS) and an operation method thereof, which improve the basic data transmission rate according to the carrier aggregation and also promote more various capability improvements by using a configuration for implementing the carrier aggregation.

Hereinafter, exemplary embodiments of the present disclosure will be described with reference to the accompanying drawings.

First, a case where BSs 1 and 2 to which carrier aggregation is applied provide coverage of antenna beams according to various frequency bands (for example, two frequency bands) will be described with reference to FIG. 1.

Figure 1:
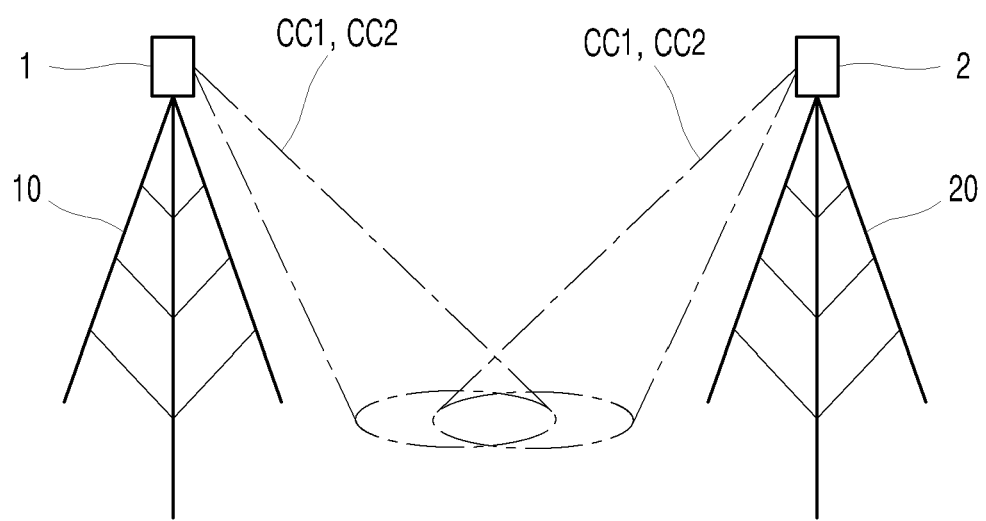
FIG. 1 is an example in which a BS to which carrier aggregation is applied provides coverage of antenna beams according to a plurality of frequency bands.

For example, as illustrated in FIG. 1, the antenna apparatus 1 for BS of the BS 10 forms the same radiation pattern (or antenna pattern or far-field pattern) for antenna beams CC1 and CC2 of two different frequency bands in the same radiated direction with respect to one cell, so that coverages of antenna beams of two different frequency bands exist in one cell. Further, as illustrated in FIG. 1, the antenna apparatus 2 for BS of the BS 20 forms the same radiation pattern for antenna beams CC1 and CC2 of two different frequency bands in the same radiated direction with respect to one cell, so that coverages of antenna beams of two different frequency bands exist in one cell.

Accordingly, when a communication service is provided through a BS applying carrier aggregation, a UE uses a wider bandwidth through the BS, and thus a rapid increase in data traffic is able to be efficiently handled and a data transmission rate is able to be improved.

Furthermore, the present disclosure provides an antenna apparatus for BS which improves the basic data transmission rate according to the carrier aggregation and also promotes more various capability improvements by using a configuration for implementing the carrier aggregation.

More specifically, in the BSs 10 and 20 including the aforementioned antenna apparatuses 1 and 2 for BS, a tilting angle of an antenna unit forming the antenna beam CC1 and a tilting angle of an antenna unit forming the antenna beam CC2 are the same as each other, so that coverages of the antenna beams of two different frequency bands are nearly the same in one cell as illustrated in FIG. 1. Herein, the term of "antenna beam" indicates a radiation pattern (or antenna pattern or far-field pattern) in the field of antenna design, which refers to directional (angular) dependence of the strength of the radio waves (i.e., signals) from the antenna or other source. The "antenna beam" also indicates a radiation pattern in a particular direction or directional pattern by transmitting the radio waves to a designated coverage area (e.g., one or more cells), for example, depending on a strength of the radio waves (i.e., a power control of a radiation pattern). However, in the BSs 10 and 20 including antenna apparatuses 100 and 200 for BS according to an embodiment of the present disclosure, a tilting angle of an antenna unit forming the antenna beam CC1 and a tilting angle of an antenna unit forming the antenna beam CC2 are controlled to be different from each other. In this case, in the BSs 10 and 20, tilting angles (i.e. at least one of vertical tilting angle and horizontal tilting angle) of an antenna unit forming the antenna beam CC1 and an antenna unit forming the antenna beam CC2 can be controlled to be different to each other.

Figure 2:
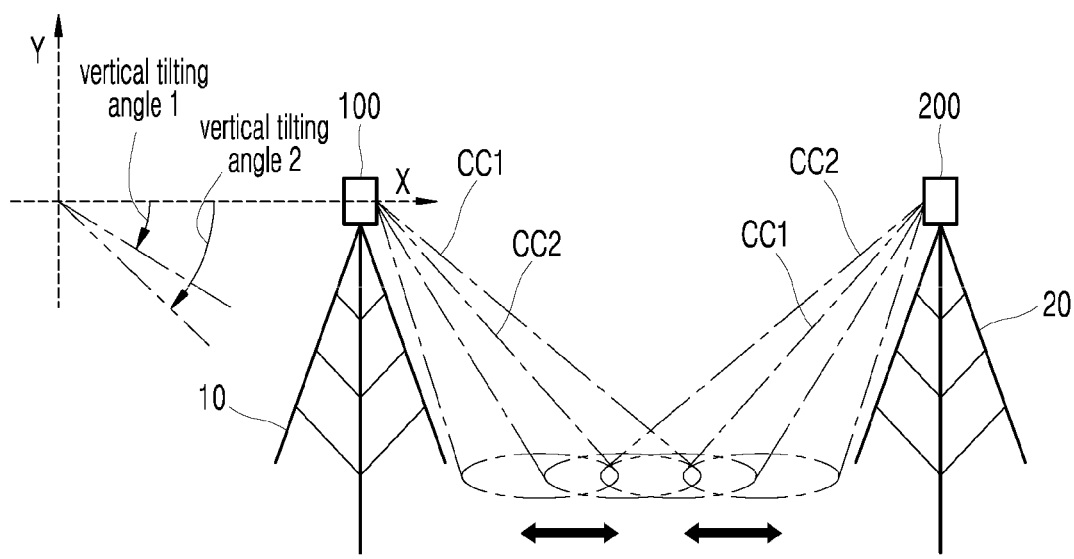
FIGS. 2 and 3 are an example in which BSs having an antenna apparatus for BS provides coverage of antenna beams according to various frequency bands according to an exemplary embodiment of the present disclosure.
Figure 3:
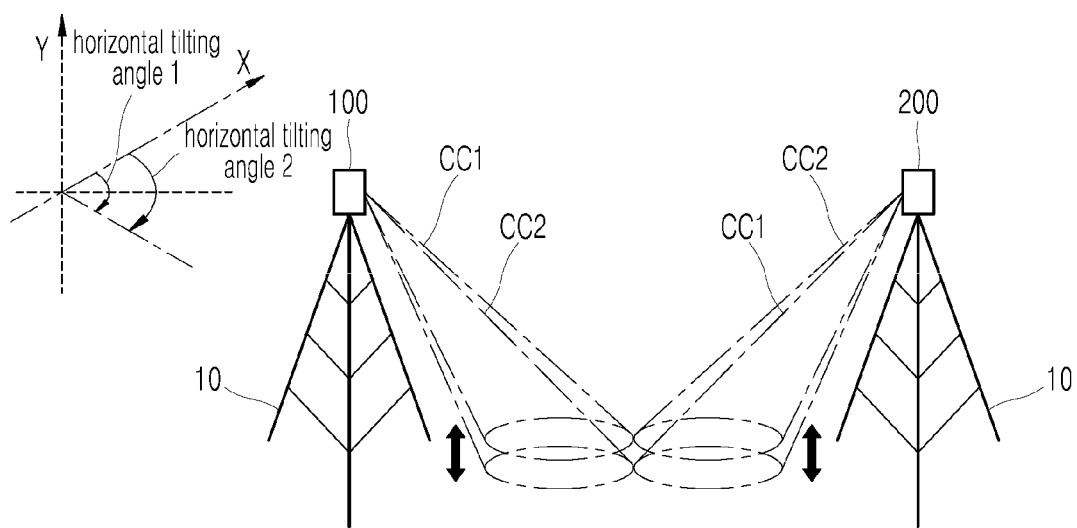

For example, as illustrated in FIG. 2, in the BSs 10 and 20 including antenna apparatuses 100 and 200 for BS according to an embodiment of the present disclosure, a vertical tilting angle of an antenna unit (e.g., antenna unit 1 of two or more antenna units 110*a* in FIG. 3) forming the antenna beam CC1 and a vertical tilting angle of an antenna unit (e.g., antenna unit 2 of two or more antenna units 110*a* in FIG. 3) forming the antenna beam CC2 can be controlled to be different from each other. In addition, as illustrated in FIG. 3, in the BSs 10 and 20 including antenna apparatuses 100 and 200 for BS according to an embodiment of the present disclosure, a horizontal tilting angle of an antenna unit forming the antenna beam CC1 and a horizontal tilting angle of an antenna unit forming the antenna beam CC2 can be controlled to be different from each other.

Accordingly, the antenna apparatus 100 for BS of the BS 10 forms different radiation patterns (or antenna patterns or far-field patterns) in a different direction for antenna beams CC1 and CC2 of two different frequency bands with respect to one cell, so that coverages of the antenna beams of the two different frequency bands are different from each other in one cell. Further, the antenna apparatus 200 for BS of the BS 20 forms different radiation patterns (or antenna patterns or far-field patterns) in a different direction for antenna beams CC1 and CC2 of two different frequency bands with respect to one cell, so that coverages of the antenna beams of the two different frequency bands are different from each other in one cell.

Furthermore, according to an embodiment of the present disclosure, between the antenna apparatuses 100 and 200 for BS of the neighboring BSs 10 and 20, the tilting angle of the antenna unit forming the antenna beam CC1 and the tilting angle of the antenna unit forming the antenna beam CC2 are controlled to be in different directions for antenna beams from each other.

Accordingly, in FIG. 2, the coverage of the antenna beam CC1 of the BS 10 and the coverage of the antenna beam CC1 of the BS 20 are not overlap each other in areas or cell(s) commonly covered or radiated by the BS 10 and the BS 20, and the coverage of the antenna beam CC2 of the BS 10 and the coverage of the antenna beam CC2 of the BS 20 are not overlap each other in areas or cell(s) commonly covered or radiated by the BS 10 and the BS 20.

Hereinafter, a configuration of the antenna apparatus for BS according to an embodiment of the present disclosure will be described in more detail with reference to FIG. 4. At this time, for the convenience of the description, the following description will be made based on the antenna apparatus 100.

The antenna apparatus 100 for BS according to at least one embodiment of the present disclosure, corresponds to an apparatus included in the BS 10 having (or covering) a cell or cell(s), which includes two or more antenna units 110*a* for forming antenna beams for each of two or more different frequency bands based on predetermined tiling angles, and a tilting angle control unit 120 configured to control the predetermined tilting angles of the two or more antenna units 110*a* to be set as different tiling angles from each other, so as to make coverages of the antenna beams according to the two or more different frequency bands formed or radiated by the two or more antenna units 110*a* with respect to one cell, different from each other.

Here, the BS 10 has a single cell (or sector) or a plurality of cells as a service coverage. That is, the BS 10 provides communication services to be transmitted to and/or received from one or more user equipments camped on the single cell or the plurality of cells. For example, when the BS 10 has (or covers) three cells, the antenna apparatus 100 for BS includes two or more antenna units 110*a*, two or more antenna units 110*b*, and two or more antenna units 110*c* in every one cell.

Hereinafter, for convenience of the description, the following description will be made based on the two or more antenna units 110*a* for forming antenna beams with respect to one cell (for example, a cell 13) among the three cells (for example, cells 11, 12, and 13 of FIG. 4) included in the BS 10.

The two or more antenna units 110*a* form antenna beams for two or more different frequency bands based on predetermined tilting angles with respect to a cell, for example, the cell (for example, the cell 13) included in the BS 10.

For example, when the two or more different frequency bands correspond to two different frequency bands (for example, a first frequency band and a second frequency band), the two or more antenna units 110*a* form (or radiate) antenna beams for two different frequency bands according to predetermined tilting angles (vertical tilting angle and horizontal tilting angle) with respect to the cell.

To the end, the two or more antenna units 110*a* includes antenna unit 1 for forming an antenna beam of the first frequency band with respect to the cell and antenna unit 2 for forming an antenna beam of the second frequency band with respect to the cell.

Accordingly, the antenna apparatus 100 for BS forms the antenna beam (hereinafter, referred to as CC1) of the first frequency band radiated (or transmitted) by antenna unit 1 and forms the antenna beam (hereinafter, referred to as CC2)

of the second frequency band radiated (or transmitted) by antenna unit 2 with respect to the cell 13, so that coverages of both of the antenna beams according to the two different frequency bands exist in the cell 13.

At this time, when tilting angles (vertical tilting angle and horizontal tilting angle) of antenna unit 1 and antenna unit 2 are configured to be the same as each other, the coverages of the antenna beams CC1 and CC2 for two different frequency bands be nearly the same as illustrated in FIG. 1.

Accordingly, the tilting angle control unit 120 of the antenna apparatus 100 for BS controls the predetermined tilting angles of the two or more antenna units 110a to be set up as different angles from each other. That is, the tilting angle control unit 120 controls the predetermined tilting angles (vertical tilting angle and horizontal tilting angle) of the two or more antenna units 110a to be different from each other, so as to make the coverages of the antenna beams according to the two or more different frequency bands formed by the two or more antenna units 110a with respect to the cell set up differently as illustrated in FIG. 2 or 3.

That is, the tilting angle control unit 120 makes the coverages of the antenna beams CC1 and CC2 for the two different frequency bands each formed by antenna unit 1 and antenna unit 2 with respect to the cell set up differently each other by controlling the predetermined vertical tilting angles of antenna unit 1 and antenna unit 2 to be different from each other. For the convenience of the description, the following description will be made regarding an embodiment of adjusting vertical tilting angle among vertical tilting angle and horizontal tilting angle for two or more antenna units 110a.

For example, the tilting angle control unit 120 controls both of the vertical tilting angles of antenna unit 1 and antenna unit 2 to set up differently each other. Alternatively, the tilting angle control unit 120 controls either of the vertical tilting angles of antenna unit 1 and antenna unit 2.

Here, with respect to the coverages of the antenna beams according to the two or more different frequency bands, the coverage of the antenna beam formed by the antenna unit having a larger vertical tilting angle among the two or more antenna units 110a becomes smaller.

More specifically, when the ground on which the BS 10 is installed is an x axis and a y axis is configured in a vertical direction of the BS 10, the vertical tilting angle corresponds to an angle toward the y axis from the x axis in a fourth quadrant of x and y plane coordinates as illustrated in FIG. 2.

Accordingly, when vertical tilting angle 1 is designated to antenna unit 1 and vertical tilting angle 2 is designated to antenna unit 2 as illustrated in FIG. 2, the coverage of the antenna beam CC2 formed by antenna unit 2 faces the center of the cell and the coverage of the antenna beam CC1 formed by antenna unit 1 faces a boundary of the cell.

Further, since vertical tilting angle 2 designated to antenna unit 2 is larger than vertical tilting angle 1 designated to antenna unit 1 as illustrated in the antenna apparatus 100 of FIG. 2, the coverage of the antenna beam CC2 is smaller than the coverage of the antenna beam CC1.

As described above, the antenna apparatus 100 for BS controls the configuration for implementing the carrier aggregation, that is, controlling the tilting angles (vertical tilting angle and horizontal tilting angle) of the respective antenna units according to frequency bands to be different from each other, so as to compensate for capability between the coverage of the antenna beam CC1 and the coverage of the antenna beam CC2 and thus increase an improvement effect of a basic data transmission rate according to the carrier aggregation.

Hereinafter, a configuration will be described in which the antenna apparatus 100 for BS controls the coverages of antenna beams of antenna unit 1 and antenna unit 2 not to overlap coverage of an antenna beam of the same frequency band used in an adjacent cell when the tilting angles (e.g. vertical tilting angle) of antenna unit 1 and antenna unit 2 are controlled to be different from each other.

To this end, the antenna apparatus 100 for BS further includes an adjacent cell identification unit 130 and an adjacent cell grouping unit 140.

The adjacent cell identification unit 130 identifies adjacent cells of the cell.

For example, in a place such as a highway, BSs are installed to arrange cells linearly along the highway. Accordingly, in this case, the adjacent cell identification unit 130 is highly likely to identify a single cell, for example, a cell of another adjacent BS (for example, the BS 20) as the adjacent cell of the cell.

Figure 4:
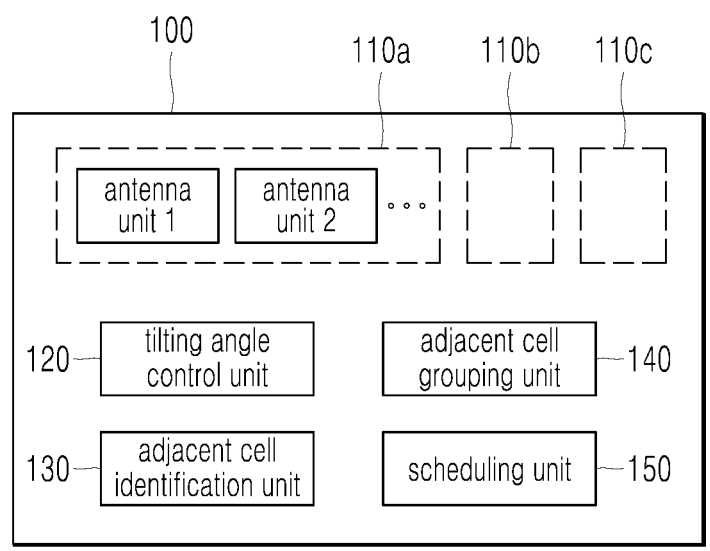
FIG. 4 is a block diagram of a configuration of an antenna apparatus for BS according to an exemplary embodiment of the present disclosure.

Meanwhile, in a general place (for example, the downtown), BSs are installed to arrange cells widely without any empty as illustrated in FIG. 4. Accordingly, in this case, the adjacent cell identification unit 130 is highly likely to identify a plurality of cells, for example, other cells of the BS 10 and cells of other BSs (for example, BSs 20, 30, and 40) as the adjacent cells of the cell.

Hereinafter, for convenience of the description, the following description will be made based on the cell 13 for the two or more antenna units 110a among three cells 11, 12, and 13 included in the BS 10 with reference to FIG. 4.

Referring to FIG. 4, the adjacent cell identification unit 130 identifies other cells 12 and 11 of the same BS 10, a cell 23 of another BS 20, a cell 32 of another BS 30, and cells 43 and 41 of another BS 40 as the adjacent cells of the cell 13.

The tilting angle control unit 120 controls the vertical tiling angles of the two or more antenna units 110a to thereby avoid overlapping the coverages of the antenna beams for two or more different frequency bands with coverage of an antenna beam of the same frequency band formed by at least one adjacent cell among the adjacent cells identified by the adjacent cell identification unit 130.

That is, the tilting angle control unit 120 controls the tilting angles of antenna unit 1 and antenna unit 2 to thereby avoid overlapping the coverages of the antenna beams CC1 and CC2 according to two different frequency bands with the coverage of antenna beams of the same frequency bands formed by at least one adjacent cell. For the convenience of the description, the following description will be made regarding an embodiment of adjusting vertical tilting angle among vertical tilting angle and horizontal tilting angle for two or more antenna units 1 and 2.

More specifically, the tilting angle control unit 120 controls a particular antenna unit among the two or more antenna units 110a such that a vertical tilting angle of the particular antenna unit is set up differently from a vertical tilting angle of another antenna unit of the adjacent cells. Herein, both the particular antenna and said another antenna unit form an antenna beam of the same frequency band.

Here, the particular antenna unit is an antenna unit forming an antenna beam of a particular frequency band among the two or more antenna units 110a, and the particular frequency band is one of the two or more different frequency bands.

Hereinafter, cases where the number of adjacent cells identified by the adjacent cell identification unit 130 is single or plural will be described.

First, the case where the number of adjacent cells is single (for example, the cell 23 of the BS 20) will be described. At least one adjacent cell identified by the adjacent cell identification unit 130 is a single adjacent cell identified by the adjacent cell identification unit 130.

In the following description, it is assumed for convenience of description that the two or more different frequency bands correspond to the first frequency band and the second frequency band as described above.

The tilting angle control unit 120 controls a vertical tilting angle of antenna unit 1 such that the vertical tilting angle of antenna unit 1 forming an antenna beam of the first frequency band is different from a vertical tilting angle of an antenna unit of BS 20, where the antenna unit of BS 20 forms an antenna beam of the same first frequency band in the cell 10 as one in the cell 23 of the adjacent cell, that is, the BS 20.

That is, when the vertical tilting angle designated to the antenna unit of the first frequency band sets as vertical tilting angle 2 in the cell 23 of the BS 20, the tilting angle control unit 120 controls the vertical tilting angle of antenna unit 1 of BS 10 to set as vertical tilting angle 1, so as to be different from vertical tilting angle 2.

Further, the tilting angle control unit 120 make a control such that a vertical tilting angle of a particular antenna unit between antenna units 1 and 2, for example, antenna unit 2 forming an antenna beam of the second frequency band is different from a vertical tilting angle of an antenna unit of BS 20 forming an antenna beam of the second frequency band in the cell 23 of BS 20.

That is, when the vertical tilting angle designated to the antenna unit of the second frequency band sets as vertical tilting angle 1 in the cell 23 of the BS 20, the tilting angle control unit 120 controls the vertical tilting angle of antenna unit 2 of BS 10 to set as vertical tilting angle 2, so as to be different from vertical tilting angle 1.

By controlling the vertical tilting angles of antenna unit 1 and antenna unit 2 of the BS 10 to be different from each other, the tilting angle unit 120 controls antenna units 1 and 2 such that coverages of antenna beams of antenna units 1 and 2 do not overlap coverages of antenna beams of the same frequency bands formed in adjacent cell.

As illustrated in FIG. 2, with respect to the antenna apparatuses 100 and 200 for BS of the neighboring BSs 10 and 20, vertical tilting angles of the antenna units forming the antenna beams CC1 of the first frequency band are controlled to not overlap each other and vertical tilting angles of the antenna units forming the antenna beams CC2 of the second frequency band are controlled to not overlap each other, so that the coverage of the antenna beam CC1 of the BS 10 does not overlap the coverage of the antenna beam CC1 of the BS 20 and the coverage of the antenna beam CC2 of the BS 10 does not overlap the coverage of the antenna beam CC2 of the BS 20.

Meanwhile, when the number of adjacent cells is plural, at least one adjacent cell identified by the adjacent cell identification unit 130 is an adjacent cell identified within an adjacent cell group that is grouped by the adjacent cell grouping unit 140.

The adjacent cell grouping unit 140 is firstly described. The adjacent cell grouping unit 140 groups adjacent cells of the cell 13, which are identified by the adjacent cell identification unit 130.

Figure 5:
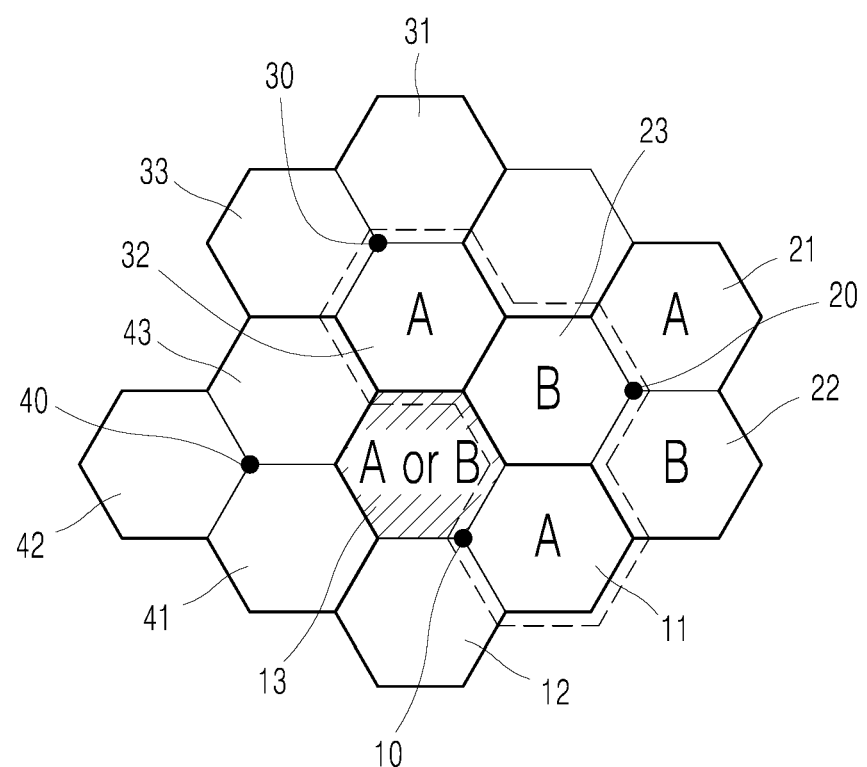
FIG. 5 is sectors (cells) included in BSs having antenna apparatuses for BS according to an exemplary embodiment of the present disclosure.

For example, referring to FIG. 5, the adjacent cell grouping unit 140 groups adjacent cells (for example, cells 11, 23, and 32) of which tilting angles of antenna units according to respective frequency bands have been completely controlled, among adjacent cells 12, 11, 23, 32, 43, and 41 identified by the adjacent cell identification unit 130.

Alternatively, the adjacent cell grouping unit 140 firstly selects N adjacent cells which give the largest interference to the cell 13 from the adjacent cells of which the tilting angles of the antenna units according to the respective frequency bands have been completed controlled among the adjacent cells 12, 11, 23, 32, 43, and 41 identified by the adjacent cell identification unit 130, and then groups the selected adjacent cells.

Further, as described above, the first frequency band and the second frequency band are described as the two or more different frequency bands. It is assumed that a state where vertical tilting angle 1 is designated to the antenna unit forming the antenna beam CC1 of the first frequency band and vertical tilting angle 2 (greater than (>) vertical tilting angle 1) is designated to the antenna unit forming the antenna beam CC2 of the second frequency band is A. In contrast, it is assumed that a state where vertical titling angle 2 is designated to the antenna unit forming the antenna beam CC1 of the first frequency band and vertical tilting angle 1 (lesser than (<) vertical tilting angle 2) is designated to the antenna unit forming the antenna beam CC2 of the second frequency band is B.

In this case, when the adjacent cell grouping unit 140 groups the adjacent cells 11, 23, and 32, the adjacent cell 11 and the adjacent cell 32 correspond to A and the adjacent cell 23 corresponds to B among the adjacent cells 11, 23, and 32 within the adjacent cell group as illustrated in FIG. 5.

That is, based on the number of adjacent cells having the same vertical tilting angle of the antenna units forming the antenna beams of a particular frequency band, for example, the first frequency band, the same adjacent cells, that is, adjacent cells to which vertical tilting angle 1 is designated are the adjacent cells 11 and 32.

Further, based on the number of adjacent cells having the same vertical tilting angle of the antenna units forming the antenna beams of a particular frequency band, for example, the second frequency band, the same adjacent cells, that is, adjacent cells to which vertical tilting angle 2 is designated are the adjacent cells 11 and 32.

Accordingly, referring to FIG. 4, at least one of the adjacent cells identified by the adjacent cell identification unit 130 adjacent cells 11 and 32 among the adjacent cells 11, 23, and 32 within the adjacent cell group.

The tilting angle control unit 120 controls a vertical tilting angle of a particular antenna unit between antenna units 1 and 2, for example, antenna unit 1 forming an antenna beam of the first frequency band to be different from vertical tilting angles of antenna units forming antenna beams of the first frequency band in at least one adjacent cell (i.e., the adjacent cells 11 and 32) identified within the adjacent cell group.

That is, when the vertical tilting angles designated to the antenna units of the first frequency band correspond to vertical tilting angle 1 in the adjacent cells 11 and 32, the tilting angle control unit 120 controls the vertical tilting angle of antenna unit 1 to become vertical tilting angle 2, so as to be different from vertical tilting angle 1.

Further, the tilting angle control unit 120 may make a control such that a vertical tilting angle of a particular antenna unit between antenna units 1 and 2, for example, antenna unit 2 forming an antenna beam of the second frequency band is different from vertical tilting angles of antenna units forming antenna beams of the second frequency band in the adjacent cells 11 and 32.

That is, when the vertical tilting angles designated to the antenna units of the second frequency band correspond to vertical tilting angle 2 in the adjacent cells 11 and 32, the tilting angle control unit 120 controls the vertical tilting angle of antenna unit 2 to become vertical tilting angle 1, so as to be different from vertical tilting angle 2.

Meanwhile, alternatively, based on vertical tilting angles of antenna units designated with respect to the particular frequency band in respective adjacent cells within the adjacent cell group grouped by the adjacent cell grouping unit 140, the tilting angle control unit 120 identifies a vertical tilting angle which is most frequently designated to the particular frequency band in the adjacent cell group.

When the adjacent cell 11 and the adjacent cell 32 correspond to A and the adjacent cell 23 corresponds to B as described above, the tilting angle control unit 120 identifies the vertical tilting angle, which is most frequently designated to the particular frequency band, for example, the first frequency band in the adjacent cell group including adjacent cells 11, 23, and 32, as vertical tilting angle 1.

In other words, based on the number of adjacent cells having the same vertical tilting angle of the antenna units designated with respect to the first frequency band, at least one of the adjacent cells identified by the adjacent cell identification unit 130 corresponds to adjacent cells (i.e., the adjacent cells 11 and 32), which have the same vertical tilting angles corresponding to having vertical tilting angle 1.

Meanwhile, the tilting angle control unit 120 identifies the most frequently designated vertical tilting angle in the adjacent cell group including the adjacent cells 11, 23, and 32 with respect to a particular frequency band, that is, the second frequency band, as vertical tilting angle 2.

In other words, based on the number of adjacent cells having the same vertical tilting angle of the antenna units designated with respect to the second frequency band, at least one of the adjacent cells identified by the adjacent cell identification unit 130 corresponds to adjacent cells (i.e., the adjacent cells 11 and 32), which have the same vertical tilting angles corresponding to having vertical tilting angle 2.

Accordingly, the tilting angle control unit 120 controls the vertical tilting angle of antenna unit 1 to become different from vertical tilting angle 1 which is most frequently designated in the adjacent cell group with respect to the first frequency band. That is, the tilting angle control unit 120 controls the vertical tilting angle of antenna unit 1 to be vertical tilting angle 2, so as to be different from vertical tilting angle 1.

Further, the tilting angle control unit 120 controls the vertical tilting angle of antenna unit 2 to become different from vertical tilting angle 2, which is most frequently designated in the adjacent cell group with respect to the second frequency band. That is, the tilting angle control unit 120 controls the vertical tilting angle of antenna unit 2 to be vertical tilting angle 1, so as to be different from vertical tilting angle 2.

As described above, when controlling the vertical tilting angles of antenna unit 1 and antenna unit 2 of the BS 10 to be different from each other, the tilting angle control unit 120 designates the state B, which is opposite to the state A of the vertical tilting angles designated to the antenna units, to the cell, so that the coverage of the cell is controlled to not overlap the coverage of the antenna beam of the same frequency band used in the adjacent cells 11 and 32.

As described above, the tilting angle control unit 120 controls and/or designates vertical tilting angles of respective antenna units with respect to all cells (for example, the cells 11, 12, and 13) of the BS 10 as well as the cell 13 of the BS 10.

As described above, the antenna apparatus 100 for BS controls the configuration for implementing the carrier aggregation, that is, control the vertical tilting angles of the respective antenna units according to respective frequency bands to be different from each other, and further controls the tilting angles (e.g. vertical tilting angles) to be different from vertical tilting angles of antenna units of the same frequency band used in adjacent cells, so that inter-cell interference at the cell boundary is able to be reduced and thus performance is able to be improved.

Meanwhile, based on the antenna apparatus 100 for BS according to an embodiment of the present disclosure as described above, since the tilting angles (vertical tilting angle and horizontal tilting angle) of the antenna units according to the respective frequency bands are different from each other, not only coverage of the antenna beams CC1 and CC2 according to respective frequency bands but also the antenna pattern and path loss become different.

Accordingly, a radio resource scheduling method suitable for the antenna apparatus 100 for BS according to the present disclosure, which makes the tilting angles of the antenna units according to respective frequency bands different from each other as described above, is also needed.

Accordingly, the antenna apparatus 100 for BS according to an embodiment of the present disclosure further includes a scheduling unit 150. For the convenience of the description, the following description will be made regarding an embodiment of adjusting vertical tilting angle among vertical tilting angle and horizontal tilting angle designated for two or more antenna units 110a.

Based on the vertical tilting angles designated to the two or more antenna units 110a with respect to the cell 13 of the BS 10, the scheduling unit 150 sequentially performs radio resource scheduling according to the sequence from the frequency band of the antenna unit having the largest vertical tilting angle to the frequency band of the antenna unit having the smallest vertical tilting angle among the two or more different frequency bands.

More specifically, the two or more different frequency bands will be described as the first frequency band and the second frequency band as described above.

When vertical tilting angles are designated to the two or more antenna units 110a (i.e., that is antenna unit 1 and antenna unit 2), the scheduling unit 150 identifies which frequency band of the antenna unit has the largest vertical tilting angle among the vertical tilting angles designated to antenna unit 1 and antenna unit 2.

For example, when vertical tilting angle 1 is designated to antenna unit 1 and vertical tilting angle 2 (greater than (>) vertical tilting angle 1) is designated to antenna unit 2, the scheduling unit 150 identifies the second frequency band of antenna unit 2, which has the largest vertical tilting angle (i.e., vertical tilting angle 2) among vertical tiling angle 1 and vertical tiling angle 1.

Accordingly, the scheduling unit 150 firstly performs the radio resource scheduling with respect to the identified second frequency band between the first frequency band and the second frequency band.

As described above, since the scheduling unit 150 firstly performs radio resource scheduling for the second frequency band having the smallest coverage formed by antenna unit 2 having the largest vertical tilting angle, a UE located at the center of the cell receives radio resources based on a result of the performance of the radio resource scheduling and an average yield of the UE having received the radio resources will increase.

Thereafter, the scheduling unit 150 identifies the frequency band of the antenna unit having the largest vertical tilting angle among the remaining frequency bands except for the second frequency band for which the radio resource scheduling has been performed between the first frequency band and the second frequency band. In this case, the scheduling unit 150 identifies the first frequency band of antenna unit 1 having vertical tilting angle 1.

Accordingly, the scheduling unit 150 firstly performs the radio resource scheduling for the second frequency band and then performs the radio resource scheduling for the first frequency band. That is, the scheduling unit 150 performs the radio resource scheduling in connection with the first frequency band based on a result of the performance of the radio resource scheduling which has been first performed for the second frequency band (for example, average yield of the UE).

As described above, the scheduling unit 150 performs the radio resource scheduling according to the sequence from the frequency band having the smallest coverage to the frequency band having the largest coverage (i.e., performing the radio resource scheduling from second frequency band to first frequency band in an ascending manner for a coverage of an antenna beam), so that the UE located at the cell boundary receives radio resources than the UE located at the cell center which has the increased average yield because the UE has already received radio resources.

That is, the scheduling unit 150 raises a probability that the UE located at the cell center and the UE located at the cell boundary receive radio resources of frequency bands suitable therefor in consideration of coverage sizes according to respective frequency bands, which become different due to the control of the vertical tilting angles of the respective antenna units.

As described above, the scheduling unit 150 sequentially performs the radio resource scheduling according to respective frequency bands with respect to all cells (for example, the cells 11, 12, and 13) of the BS 10 as well as the cell 13 of the BS 10.

As described above, the antenna apparatus 100 for BS according to the present disclosure sequentially performs the radio resource scheduling according to the sequence from the frequency band having the smallest coverage to the frequency band having the largest coverage in consideration of the coverage sizes according to respective frequency bands, which become different due to the control of the configuration for implementing the carrier aggregation, that is, the control of the tilting angles of the respective antenna units, so that the UE located at the cell center and the UE located at the cell boundary are likely to receive radio resources of frequency bands suitable therefor.

As described above, the antenna apparatus for BS according to the present disclosure controls the configuration for implementing the carrier aggregation, that is, controls the tilting angles of the respective antenna units according to respective frequency bands to be different from each other and further controls the vertical tilting angles to be different from vertical tilting angles of antenna units of the same frequency bands used in adjacent cells, so that a basic data transmission speed can be improved according to the carrier aggregation and also the UE located at the cell center and the UE located at the cell boundary can receive radio resources of frequency bands suitable therefor.

Meanwhile, although the tilting angle control unit 120, the adjacent cell identification unit 130, the adjacent cell grouping unit 140, and the scheduling unit 150 are described as components included in the antenna apparatus for BS installed in each BS, the above described embodiments are not limited to the present disclosure and various embodiments of the present disclosure are embodied.

For example, a separate central unit that includes the tilting angle control unit 120, the adjacent cell identification unit 130, the adjacent cell grouping unit 140, and the scheduling unit 150 may be provided, and the central unit may control each BS (for example, BS 10, 20, 30 . . . ) or control each antenna apparatus (for example, antenna apparatus 100, 200, 300 . . . ) for BS installed in each BS (for example, BS 10, 20, 30 . . . ), thereby implementing the present disclosure. Other components of the antenna apparatuses 100, such as the tilting angle control unit 120, the adjacent cell identification unit 130, the adjacent cell grouping unit 140 and the scheduling unit 150 is implemented by, or includes, one or more processors and/or application-specific integrated circuits (ASICs). The antenna apparatuses 100 comprises input units (not shown) such as one or more buttons, a touch screen, a mic and so on, and output units (not shown) such as a display, an indicator and so on. The tilting angle control unit 120 further includes one or more motors each installed in and connected to each antenna unit to control corresponding vertical tilting angle of each antenna unit.

Hereinafter, an operation method of the antenna apparatus for BS according to the present disclosure will be described with reference to FIGS. 6 and 7.

In the operation method of the antenna apparatus for BS according to an exemplary embodiment of the present disclosure, a flow for designating a tilting angle of each antenna unit will be first described with reference to FIG. 6. For the convenience of the description, the following description will be made regarding an embodiment of adjusting vertical tilting angle among tilting angles (i.e. vertical tilting angle and horizontal tilting angle) for each of antenna units.

The operation method of the antenna apparatus for BS according to an exemplary embodiment of the present disclosure identifies two or more antenna units 110*a* forming antenna beams for two or more different frequency bands with respect to the cell (for example, cell 13) among the three cells (for example, cells 11, 12, and 13) included in the BS 10 in step S100.

The two or more different frequency bands will be described as two frequency bands (for example, a first frequency band and a second frequency band). The operation method of the antenna apparatus for BS according to an exemplary embodiment of the present disclosure identifies antenna unit 1 forming an antenna beam of the first frequency band and antenna unit 2 forming an antenna beam of the second frequency band with respect to the cell 13.

Further, the operation method of the antenna apparatus for BS according to an exemplary embodiment of the present disclosure identifies adjacent cells of the cell 13 in step S110.

Referring to FIG. 5, the operation method of the antenna apparatus for BS according to an exemplary embodiment of the present disclosure identifies other cells 12 and 11 of the same BS 10, a cell 23 of another BS 20, a cell 32 of another BS 30, and cells 43 and 41 of another BS 40 as the adjacent cells of the cell 13.

Further, the operation method of the antenna apparatus for BS according to an exemplary embodiment of the present disclosure groups the adjacent cells identified in step S110 when the number of adjacent cells identified in step S110 are plural in step S120.

For example, referring to FIG. 5, the operation method of the antenna apparatus for BS according to an exemplary embodiment of the present disclosure groups adjacent cells (for example, cells 11, 23, and 32) of which tilting angles of antenna units according to respective frequency bands have been completely controlled, among the adjacent cells 12, 11, 23, 32, 43, and 41 identified in step S110.

Also, the operation method of the antenna apparatus for BS according to an exemplary embodiment of the present disclosure firstly select N adjacent cells which give the largest interference to the cell 13 from the adjacent cells of which the tilting angles of the antenna units according to the respective frequency bands have been completed controlled among the adjacent cells 12, 11, 23, 32, 43, and 41 identified in step S110, and then groups the selected adjacent cells.

The operation method of the antenna apparatus for BS according to an exemplary embodiment of the present disclosure identifies, among the grouped adjacent cells within the adjacent cell group, one or more adjacent cells which have antenna units of which vertical titling angles according to a particular frequency band are the same among two or more different frequency bands in step S130.

For example, as described above, the two or more different frequency bands will be described as the first frequency band and the second frequency band. In this case, it is assumed that a state where vertical titling angle 1 is designated to the antenna unit forming the antenna beam CC1 of the first frequency band and vertical tilting angle 2 (greater than (>) vertical tilting angle 1) is designated to the antenna unit forming the antenna beam CC2 of the second frequency band is A. In contrast, it is assumed that a state where vertical titling angle 2 is designated to the antenna unit forming the antenna beam CC1 of the first frequency band and vertical tilting angle 1 (lesser than (<) vertical tilting angle 2) is designated to the antenna unit forming the antenna beam CC2 of the second frequency band is B.

In this case, in the operation method of the antenna apparatus for BS according to an exemplary embodiment of the present disclosure, when the adjacent cells 11, 23, and 32 are grouped, the adjacent cell 11 and the adjacent cell 32 correspond to A and the adjacent cell 23 corresponds to B among the adjacent cells 11, 23, and 32 within the adjacent cell group as illustrated in FIG. 4.

That is, based on the number of adjacent cells having the same vertical tilting angle of the antenna units forming the antenna beams of a particular frequency band (for example, the first frequency band), the same adjacent cells, that is, adjacent cells to which vertical tilting angle 1 is designated are the adjacent cells 11 and 32.

Further, based on the number of adjacent cells having the same vertical tilting angle of the antenna units forming the antenna beams of a particular frequency band (for example, the second frequency band), the same adjacent cells, that is, adjacent cells to which vertical tilting angle 2 is designated are the adjacent cells 11 and 32.

Accordingly, referring to FIG. 4, the operation method of the antenna apparatus for BS according to an exemplary embodiment of the present disclosure identifies the adjacent cells 11 and 32 among the respective adjacent cells within the adjacent cell group in step S130.

Further, the operation method of the antenna apparatus for BS according to an exemplary embodiment of the present disclosure controls the vertical tilting angles of antenna unit 1 and antenna unit 2 to not overlap vertical titling angles designated to the antenna units of the same frequency band in the adjacent cells 11 and 32 identified in step S130.

In other words, the operation method of the antenna apparatus for BS according to an exemplary embodiment of the present disclosure controls the vertical tilting angle of antenna unit 1 forming the antenna beam of a particular frequency band, for example, the first frequency band between the two frequency bands to be different from the vertical tilting angle of the antenna unit forming the antenna beam of the first frequency band in the adjacent cells 11 and 32.

That is, when the vertical tilting angles designated to the antenna units of the first frequency band in the adjacent cells 11 and 32 correspond to vertical tilting angle 1, the operation method of the antenna apparatus for BS according to an exemplary embodiment of the present disclosure controls the vertical tilting angle of antenna unit 1 to become vertical tilting angle 2, so as to be different with vertical tilting angle 1.

Further, the operation method of the antenna apparatus for BS according to an exemplary embodiment of the present disclosure controls the vertical tilting angle of antenna unit 2 forming the antenna beam of a particular frequency band, for example, the second frequency band between the two frequency bands to be different from the vertical tilting angle of the antenna unit forming the antenna beam of the second frequency band in the adjacent cells 11 and 32.

That is, when the vertical tilting angles designated to the antenna units of the second frequency band in the adjacent cells 11 and 32 correspond to vertical tilting angle 2, the operation method of the antenna apparatus for BS according to an exemplary embodiment of the present disclosure controls the vertical tilting angle of antenna unit 2 to become vertical tilting angle 1, so as to be different from vertical tilting angle 2.

Accordingly, when controlling the vertical tilting angles of antenna unit 1 and antenna unit 2 of the BS 10 to be different from each other, the operation method of the antenna apparatus for BS according to an exemplary embodiment of the present disclosure designates the state B, which is opposite to the state A of the vertical tilting angles designated to the antenna units, to the cell, so that the coverage of the cell is controlled to not overlap the coverage of the antenna beam of the same frequency band used in the adjacent cells 11 and 32.

Meanwhile, when the number of adjacent cells identified in step S110 is single (for example, the cell 23 of the BS 20), the operation method of the antenna apparatus for BS according to an exemplary embodiment of the present disclosure controls the vertical tilting angles of antenna unit 1 and antenna unit 2 to not overlap vertical tilting angles designated to antenna units of the same frequency bands in the single adjacent cell (for example, the cell 23 of the BS 20) identified in step S110 in step S140 without steps S120 and S130.

That is, when the vertical tilting angle designated to the antenna unit of the first frequency band in the adjacent cell 23 of the BS 20 corresponds to vertical tilting angle 2, the operation method of the antenna apparatus for BS according to an exemplary embodiment of the present disclosure controls the vertical tilting angle of antenna unit 1 to become vertical tilting angle 1, so as to be different with vertical tilting angle 2.

Further, when the vertical tilting angle designated to the antenna unit of the second frequency band in the adjacent cell 23 of the BS 20 corresponds to vertical tilting angle 1, the operation method of the antenna apparatus for BS according to an exemplary embodiment of the present disclosure controls the vertical tilting angle of antenna unit 2 to become vertical tilting angle 2, so as to be different with vertical tilting angle 1.

As described above, when controlling the vertical tilting angles of the respective antenna units with respect to the cell 13 of the BS 10 through step S140, the operation method of the antenna apparatus for BS according to an exemplary embodiment of the present disclosure determines whether the vertical tilting angles are controlled with respect to all cells of the BS 10 in step S150.

When the vertical tilting angles are not completely controlled with respect to all cells in step S150-No, the operation method of the antenna apparatus for BS according to an exemplary embodiment of the present disclosure identifies two or more antenna units 110a forming antenna beams for two or more different frequency bands with respect to the next cell (for example, the cell 12) in step S160 and enters step S110 described above.

Meanwhile, when the vertical tilting angles are completely controlled with respect to all cells in step S150—Yes, the operation method of the antenna apparatus for BS according to an exemplary embodiment of the present disclosure ends the control of the vertical tilting angles in the BS 10.

Hereinafter, a radio resource scheduling process according to each frequency band in the operation method of the antenna apparatus for BS according to an exemplary embodiment of the present disclosure will be described with reference to FIG. 7. For the convenience of the description, the following description will be made regarding an embodiment of adjusting vertical tilting angle among vertical tilting angle and horizontal tilting angle to be different to each other for two or more antenna units.

When it is determined in step S200 that the vertical tilting angles are completely controlled with respect to all cells of the BS 10 in step S150 of FIG. 5, the operation method of the antenna apparatus for BS according to an exemplary embodiment of the present disclosure identifies a frequency band of an antenna unit having the largest vertical tilting angle for each cell in step S210. Hereinafter, for convenience of the description, the following description will be made based on the cell 13 among the respective cells of the BS 10.

As described above, two or more different frequency bands will be described as the first frequency band and the second frequency band. The operation method of the antenna apparatus for BS according to an exemplary embodiment of the present disclosure identifies a frequency band of an antenna unit having the largest vertical tilting angle between antenna 1 and antenna 2 with respect to the cell 13.

For example, when vertical tilting angle 1 is designated to antenna unit 1 and vertical tilting angle 2 (greater than (>) vertical tilting angle 1) is designated to antenna unit 2, the operation method of the antenna apparatus for BS according to an exemplary embodiment of the present disclosure identifies the second frequency band of antenna unit 2 having the largest vertical tilting angle (i.e., vertical tilting angle 2).

Accordingly, the operation method of the antenna apparatus for BS according to an exemplary embodiment of the present disclosure firstly performs radio resource scheduling in connection with the second frequency band between the first frequency band and the second frequency band in step S220.

As described above, since the operation method of the antenna apparatus for BS according to an exemplary embodiment of the present disclosure firstly performs radio resource scheduling for the second frequency band having the smallest coverage formed by antenna unit 2 having the largest vertical tilting angle, a UE located at the center of the cell receives radio resources based on a result of the performance of the radio resource scheduling and an average yield of the UE having received the radio resources will increase.

Thereafter, the operation method of the antenna apparatus for BS according to an exemplary embodiment of the present disclosure determines whether the radio resource scheduling is completed for all frequency bands of the cell 13 in step S230.

When the radio resource scheduling is not completed for all frequency bands based on a result of the determination of step S230 in step S230-No, the operation method of the antenna apparatus for BS according to an exemplary embodiment of the present disclosure identifies a frequency band of an antenna unit having the largest vertical tilting angle of the other frequency band except for the second frequency band for which the radio resource scheduling has been performed between the first frequency band and the second frequency band in step S240. In this case, the operation method of the antenna apparatus for BS according to an exemplary embodiment of the present disclosure identifies the first frequency band of antenna unit 1 having vertical tilting angle 1.

Accordingly, the operation method of the antenna apparatus for BS according to an exemplary embodiment of the present disclosure performs the radio resource scheduling in connection with the first frequency band in step S220. That is, the operation method of the antenna apparatus for BS according to an exemplary embodiment of the present disclosure performs the radio resource scheduling in connection with the first frequency band based on a result of the performance of the radio resource scheduling which has been first performed for the second frequency band (for example, average yield of the UE).

Thereafter, the operation method of the antenna apparatus for BS according to an exemplary embodiment of the present disclosure determines again whether the radio resource scheduling is completed for all frequency bands of the cell 13 in step S230. In this case, the operation method of the antenna apparatus for BS according to an exemplary embodiment of the present disclosure determines that the radio resource scheduling is completed for all frequency bands in step S230—Yes and ends the radio resource scheduling.

As described above, the operation method of the antenna apparatus for BS according to an exemplary embodiment of the present disclosure performs the radio resource scheduling first for the second frequency band having the smallest coverage and then performs the radio resource scheduling for the first frequency band having a relatively large coverage based on a result of the performance of the radio resource scheduling according to the first radio resource scheduling, so that the UE located at a cell boundary is likely to receive radio resources than the UE located at the cell center, which has the increased average yield because the UE has already received the radio resources.

That is, the operation method of the antenna apparatus for BS according to an exemplary embodiment of the present disclosure sequentially performs the radio resource scheduling according to the sequence from the frequency band having the smallest coverage to the frequency band having the largest coverage in consideration of the coverage sizes according to respective frequency bands which become different due to the control of the vertical tilting angles of the respective antenna units, so that the UE located at the cell center and the UE located at the cell boundary are likely to receive radio resources of frequency bands suitable therefor.

The operation method of the antenna apparatus for BS according to an embodiment of the present disclosure is implemented in the form of program commands executable through various computer means and recorded in a non-transitory computer readable medium. The non-transitory computer readable medium includes a program command, a data file, a data structure, and the like independently or in combination. The program command recorded in the non-transitory computer readable medium includes computer-executable instructions specially designed and configured for one or more embodiments, or computer-executable instructions that are known to and/or used by those ordinarily skilled in the computer software related art. An example of the non-transitory computer-readable recording medium includes magnetic media such as a hard disc, a floppy disc and a magnetic tape, optical media such as a CD-ROM and a DVD, magneto-optical media such as a floptical disc, and a hardware device, such as a ROM, a RAM, a flash memory, which is specially designed to store and perform the program instruction. Examples of the program command include a machine language code generated by a compiler and a high-level language code executable by a computer through an interpreter and the like. The hardware devices are configured to operate as one or more software modules and/or microprocessors to perform the operations of some embodiments of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Accordingly, an antenna apparatus for BS and an operation method thereof according to various embodiments of the present disclosure improve the basic data transmission rate according to the carrier aggregation and also promote more various capability improvements by using a configuration for implementing the carrier aggregation.

Although the present disclosure has been described in detail with reference to exemplary embodiments, the present disclosure is not limited thereto and it is apparent to those ordinarily skilled in the art that various modifications and changes can be made thereto without departing from the scope of the present disclosure. Therefore, the subject matter of the present disclosure should be identified only by the following appended claims, and all equivalents or equivalent modifications thereof should be construed as falling within the scope of the claimed invention. Specific terms used in this disclosure and drawings are used for illustrative purposes and not to be considered as limitations of the present disclosure.

What is claimed is:

1. An antenna apparatus for base station (BS) having at least one cell, the antenna apparatus comprising:
    two or more antenna units configured to transmit two or more antenna beams in a cell to form two or more different frequency bands in the cell, wherein the two or more antenna beams having predetermined tilting angles different from each other are each transmitted by the two or more antenna units to form the two or more different frequency bands within the cell;
    a tilting angle control unit configured to respectively control the two or more tilting angles of the two or more antenna units so as to avoid overlapping between coverages of the two or more antenna beams of the two or more different frequency bands within the cell; and
    an adjacent cell identification unit configured to identify one or more adjacent cells neighboring to the cell,
    wherein when the adjacent cell identification unit identifies the adjacent cells, the tilting angle control unit is configured to vertically or horizontally control the two or more tilting angles of the two or more antenna beams to avoid overlapping the coverages of the two or more antenna beams of the two or more different frequency bands with coverages of adjacent cells.

2. The antenna apparatus of claim 1,
    wherein the tilting angle control unit is configured to control the two or more tilting angles of the two or more antenna beams each transmitted by the two or more antenna units such that the coverages of the two or more antenna beams for the two or more different frequency bands do not overlap coverages of antenna beams of equal frequency bands formed in at least one of the adjacent cells.

3. The antenna apparatus of claim 2, wherein the tilting angle control unit is configured to control a tilting angle of a particular antenna unit of the two or more antenna units to be different from a tilting angle of an antenna unit forming an antenna beam of a particular frequency band equal to that of the particular antenna unit in the adjacent cells.

4. The antenna apparatus of claim 3, further comprising:
    an adjacent cell grouping unit configured to group the adjacent cells with respect to the cell,
    wherein the tilting angle control unit is configured to identify a tilting angle most frequently designated to the particular frequency band in the adjacent cell group based on the tilting angle of the antenna unit forming the antenna beam of the particular frequency band in each of adjacent cells in the adjacent cell group, and control the tilting angle of the particular antenna unit to be different from the identified tilting angle.

5. The antenna apparatus of claim 1, further comprising:
    a scheduling unit configured to sequentially perform radio resource scheduling in an order from a frequency band of an antenna unit having a largest tilting angle to a frequency band of an antenna unit having a smallest tilting angle among the two or more different frequency bands based on the tilting angles designated to the two or more antenna units.

6. The antenna apparatus of claim 1, wherein the tilting angle control unit is configured to
    a tilting angle control unit configured to respectively control the two or more tilting angles of the two or more antenna units in a vertical direction and/or a horizontal direction so as to avoid
        overlapping the coverages of the two or more antenna beams of the two or more different frequency bands with coverages of different frequency bands in adjacent cells.

7. A method of operating an antenna apparatus for base station (BS) having at least one cell, the method comprising:
    identifying two or more antenna units for transmitting two or more antenna beams in a cell to form two or more different frequency bands in the cell, wherein the two or more antenna beams having predetermined tilting angles different from each other are each transmitted by two or more antenna units to form the two or more different frequency bands within the cell; and respectively controlling two or more tilting angles of the two or more antenna units so as to avoid
overlapping between coverages of the two or more antenna beams of the two or more different frequency bands within the cell, The method further comprising:

identifying one or more adjacent cells neighboring to the cell; and vertically or horizontally controlling, when the adjacent cell identification unit identify the adjacent cells, the two or more tilting angles of the two or more antenna beams to avoid overlapping the coverages of the two or more antenna beams of the two or more different frequency bands with coverages of adjacent cells.

8. The method of claim 7, wherein the controlling of the tilting angles comprises
controlling the two or more tilting angles of the two or more antenna beams each transmitted by the two or more antenna units such that the coverages of the two or more antenna beams for the two or more different frequency bands do not overlap coverages of antenna beams of equal frequency bands formed in one or more of the adjacent cells.

9. The method of claim 8, wherein the controlling of the tilting angles comprises controlling a tilting angle of a particular antenna unit of the two or more antenna units to be different from a tilting angle of an antenna unit forming an antenna beam of a frequency band equal to that of the particular antenna unit in the adjacent cells.

10. The method of claim 9, further comprising grouping the adjacent cells of the cell, wherein the controlling of the tilting angles comprising identifying a tilting angle most frequently designated to the particular frequency band in the adjacent cell group based on the tilting angle of the antenna unit forming the antenna beam of the particular frequency band in each of adjacent cells in the adjacent cell group, and controlling the tilting angle of the particular antenna unit to be different from the identified tilting angle.

11. The method of claim 8, wherein the controlling of the tilting angles comprises respectively control the two or more tilting angles of the two or more antenna units in a vertical direction and/or a horizontal direction so as to avoid overlapping the coverages of the two or more antenna beams of the two or more different frequency bands with coverages of different frequency bands in adjacent cells.

12. The method of claim 7, further comprising sequentially performing radio resource scheduling in an order from a frequency band of an antenna unit having a largest tilting angle to a frequency band of an antenna unit having to a smallest tilting angle among the two or more frequency bands based on the tilting angles designated to the two or more antenna units.

* * * * *